United States Patent
Tough

(10) Patent No.: US 10,871,255 B2
(45) Date of Patent: Dec. 22, 2020

(54) MATERIAL FOR USE IN LINING LARGE-DIAMETER PIPES AND A METHOD OF MAKING SAME

(71) Applicant: Scott & Fyfe Limited, Tayport Fife (GB)

(72) Inventor: David Tough, Tayport Fife (GB)

(73) Assignee: Scott & Fyfe Limited

(*) Notice: Subject to any disclaimer, the term of this patent is extended or adjusted under 35 U.S.C. 154(b) by 77 days.

(21) Appl. No.: 16/346,474

(22) PCT Filed: Oct. 31, 2017

(86) PCT No.: PCT/GB2017/053276
§ 371 (c)(1),
(2) Date: Apr. 30, 2019

(87) PCT Pub. No.: WO2018/078402
PCT Pub. Date: May 3, 2018

(65) Prior Publication Data
US 2019/0277438 A1 Sep. 12, 2019

(30) Foreign Application Priority Data
Oct. 31, 2016 (GB) .................................. 1618368.3

(51) Int. Cl.
*F16L 55/165* (2006.01)
*B29C 63/30* (2006.01)
(Continued)

(52) U.S. Cl.
CPC .......... *F16L 55/1656* (2013.01); *B29C 63/26* (2013.01); *B29C 63/30* (2013.01);
(Continued)

(58) Field of Classification Search
CPC ...... F16L 55/1656; B29C 63/30; B29C 70/28; B29C 63/26; B29C 70/222; B29C 70/56;
(Continued)

(56) References Cited

U.S. PATENT DOCUMENTS 5,798,013 A 8/1998 Brandenburger
2001/0007929 A1 7/2001 Schlomski

FOREIGN PATENT DOCUMENTS

WO 2015166268 A1 11/2015

OTHER PUBLICATIONS

International Search Report corresponding to PCT/GB2017/053276 dated Feb. 20, 2018.
(Continued)

*Primary Examiner* — Michael C Miggins
(74) *Attorney, Agent, or Firm* — Sandberg Phoenix & Von Gontard, P.C.

(57) ABSTRACT

A material for use in lining large-diameter pipes is disclosed. A textile material formed to a tubular shape and impregnated with resin may, on curing the resin, repair a damaged pipe in a cure in place pipe (CIPP) rehabilitation process. The present invention provides both a novel structure of tubular material and a novel method of preparing the material for use in a CIPP rehabilitation process, specifically aimed at large-diameter pipes such as oil rig caissons. The tubular material of this invention comprises four sheets of a double-bed warp-knitted fabric (40). A first pair of sheets (52) are arranged to form, respectively, inside and outside surfaces of a first half-tube, with fabric machine direction extending along the length of the half-tube. The second pair of sheets (52a) are similarly arranged to form a second half-tube. The two half-tubes are connected at a pair of longitudinally extending joins (58, 60). The preparation process includes
(Continued)

stabilising tensioned sheets with a mesh layer (44), which makes for better handling of the knitted fabric.

24 Claims, 7 Drawing Sheets

(51) Int. Cl.
*D04B 21/16* (2006.01)
*B29C 70/28* (2006.01)
*B29C 63/26* (2006.01)
*B29C 70/22* (2006.01)
*B29C 70/56* (2006.01)
*B29D 23/00* (2006.01)

(52) U.S. Cl.
CPC .............. *B29C 70/28* (2013.01); *D04B 21/16* (2013.01); *B29C 70/222* (2013.01); *B29C 70/56* (2013.01); *B29D 23/00* (2013.01); *D10B 2403/0112* (2013.01); *D10B 2403/021* (2013.01); *D10B 2505/02* (2013.01)

(58) Field of Classification Search
CPC B29D 23/00; D04B 21/16; D10B 2403/0112; D10B 2403/021; D10B 2505/02
See application file for complete search history.

(56) References Cited

OTHER PUBLICATIONS

Written Opinion corresponding to PCT/GB2017/053276 dated Feb. 20, 2018.

mesh
adhesive
fabric

MATERIAL FOR USE IN LINING LARGE-DIAMETER PIPES AND A METHOD OF MAKING SAME

CROSS-REFERENCE TO RELATED APPLICATIONS

This application is the US National Stage under 35 USC § 371 of International Application No. PCT/GB2017/053276, filed 31 Oct. 2017 which claims priority to Great Britain Application No. 1618368.3 filed 31 Oct. 2016, both of which are incorporated herein by reference.

BACKGROUND

This invention relates to tubular lining material, in particular to a material that is used in the repair or rehabilitation of large-diameter pipes. The invention is particularly suited to the repair of caissons in the offshore oil and gas industry.

A caisson is a watertight casing that is typically used to provide a route between an offshore platform deck and a sub sea level along which services or fluids may be conveyed. Such pipes find many uses on oil rigs where they transport not only oil and gas but also ancillary services associated with its extraction and services necessary for crew maintenance. A primary function however is to carry large quantities of seawater drawn by pumps to the platform surface. Seawater is used extensively on offshore rigs for cooling rig equipment and also for fire extinction and control in an environment that presents many flammable hazards. It may additionally be used in the production of hypochlorite, which prevents microbial growth, and, after desalination, as a source of drinking water.

The caissons used in the offshore industry are highly susceptible to damage, principally arising through galvanic corrosion of the region at which the steel caisson is in contact with the metal of a seawater pump. Cracks and holes therefore develop within a relatively short timescale, localised around the pump site. This reduces the efficiency of the pump and also increases the likelihood of a section of the caisson breaking away and damaging equipment as it falls to the ocean. The cost of replacement or repair of rig equipment can be significant.

Integrity of the caisson may be preserved to some extent by taking measures to prevent corrosion. For example, by electrical connection of the caisson to a sacrificial anode or by chemical coating or dosing. Such defences will however become depleted over time and, if they are not renewed, corrosion can be aggressive and rapid.

The hostile environment in which the caisson is located also plays a part. The action of waves and currents causes the caisson to move relative to a holding guide. Localised damage may therefore arise through stress or fatigue developed where the caisson rubs against the guide.

Caissons are sizeable structures: typically ranging 40 cm-1.8 m in diameter and 20-100 m in length, only 5-30 m of which is above water. Caisson replacement is therefore expensive and potentially hazardous for crew working both above and below the waterline. There is accordingly a strong drive towards caisson repair rather than replacement.

One current repair mechanism is offered by the Hydra-Lok® system of Oil States MCS Ltd. This system employs a steel liner that is positioned within the caisson such that it spans the corroded or damaged part. A swaging tool then applies hydraulic pressure to a localised liner section above the damaged area, expanding it against the caisson and creating a permanent joint. The process is then repeated with a liner section below the damaged part. The result is a liner that is structurally connected to the caisson either side of the damaged section, which facilitates the transfer of axial and bending loads across the weakened region. The caisson is now repaired and ready to resume its original function.

This system of repair is attractive for various reasons. First, there is no diver involvement, which avoids any associated safety considerations and also reduces dependence on weather conditions. It is cost effective in that the repair may be effected without interruption to rig operation. There are however also disadvantages. Although steel is used for both liner and caisson, there will inevitably be some difference in metal composition, with the resulting join, particularly in its salt water operating environment, therefore becoming susceptible to corrosion. The practicalities of installation dictate that the liner is limited to around 3 m in length. Longer corroded sections of caisson can be repaired but only by welding or otherwise joining multiple 3 m liner segments together. These joins however tend to be sources of liner weakness. Although cost effective in that the caisson can be repaired without interruption to platform operation, the liner itself is still an expensive commodity and the installation method is relatively costly.

It is known that liners for cure in place pipe (CIPP) rehabilitation may be constructed from a textile material formed to a tubular shape and impregnated with resin. To repair the pipe, the liner is aligned to the damaged part, pressed against the pipe and then the resin is cured. The resulting composite structure: hardened resin reinforced with textile material, is thereby fixed in position to reseal the pipe. Such use of a composite material to line caissons would overcome the corrosion problems of a steel liner, however other problems have to date prevented their use in caisson repair.

There are particular considerations to be taken into account when designing a liner for a large-diameter pipe: size and strength. Clearly, the tubular liner must be sufficiently large that it fits or can be made to fit against the internal surface of the pipe. It must also be strong in order to take up the role of the damaged section of pipe that it replaces and also to withstand the stresses involved in its installation in the pipe.

Coated felt liners have been used to repair large-diameter pipes of similar sizes to caissons, sometimes with the addition of glass-based fabrics for strength. Felt materials however are difficult to handle at these sizes. This makes them impractical for use in repairing pipes in places with restricted access, such as on oil rigs.

The Brawoliner® product is noted for its ease of installation, which could readily be implemented on an oil rig. Unfortunately, this product is currently marketed as suitable for repairing pipes of diameters up to 250 mm, a long way short of the 1.8 m required for the caisson industry.

WO2015/166268 describes a warp-knitted fabric material (Alphashield™) that is used in CIPP rehabilitation. The warp knit is designed to give this textile material high flexibility and conformability, which allows it to maintain its integrity around bends and to cope with junctions between different diameter pipes. Of more relevance to caisson applications, the textile is readily infused with resin, its flexibility allows it to be rolled up and easily handled and it is adaptable in its design parameters in that it can be made to different sizes and conformabilities. It may also be knitted from glass fibre yarn, which is particularly suitable for the offshore oil and gas industry in that glass is an inert material that does not generate toxic products on combustion.

The strength of a CIPP liner may be built up by making the textile—resin composite itself stronger and/or by simply adding more layers to the textile reinforcement. The Alphashield™ material lends itself to both strengthening strategies. Glass fibre yarn is a stronger material that the polyester-based alternatives. This allows a thinner liner to be used to provide a comparable strength to alternative designs, making layering less bulky and therefore less intrusive on the internal bore of the pipe.

Pipe repair using the liner of WO2015/166268 is carried out by an inversion installation, which is eminently suitable for a rig environment. The liner is supplied in the form of a sleeve, with the knitted fabric on the inside and a film on the outside. The resin material is poured into the inside of the sleeve, which is then compressed to ensure an even distribution throughout the liner. The liner is turned inside out by the act of its insertion into the pipe, to leave the film on the inside and the liner on the outside. Once in position at the damaged section, compressed air is blown into the liner both to force the liner material against the inside of the pipe and to cure the resin. This leaves the liner affixed to the pipe, effecting the repair.

The problem with the Alphashield™ product is that the process by which it is manufactured is simply not capable of being used to fabricate a liner to the size required to repair large-diameter pipes such as caissons.

In the manufacturing process described in WO2015/166268, one or more tubes of glass fibre yarn are knitted to the required size on a double needle bed warp-knitting machine. Each knitted tube has a thickness of around 1 mm and multiple tubes are therefore needed to provide the strength necessary to line larger-diameter pipes. To build up the thickness, tubes are coated with adhesive and inserted one inside the other to create a multi-layer tubular structure. This is then wrapped in a layer of film and heated under pressure. The film allows the tubular fabric to contain the resin. It also ensures that the structure is airtight, to an extent required by the pressures involved in the installation process.

The problem with this process is the requirement to insert one tubular layer inside another. This is difficult enough with smaller tubes that can be handled relatively easily: the presently used equipment can accommodate tubes of only up to 0.5 m diameter. Theoretically, the equipment could be scaled up, but this would require significant investment of funds and would not overcome the inherent difficulty of manipulating such a weight of tubular material to get it inside a similar structure. A preferred option is therefore to seek an alternative method of preparing a textile material for use in a liner for the repair and rehabilitation of large-diameter pipes.

Fundamentally, therefore, there is a perceived need for a new approach to the problem of caisson repair.

SUMMARY

The present invention provides a material for use in lining large-diameter pipes, the material comprising four sheets of a double-bed warp-knitted fabric having a machine direction and a cross direction, the sheets being arranged into a tubular structure with:

a first half of the tube comprising a first pair of fabric sheets, one forming an inside surface of the half-tube; and the other forming an outside surface; and a second half of the tube comprising a second pair of fabric sheets similarly aligned wherein the first and second halves of the tube are connected at a pair of longitudinally extending joins; and the four fabric sheets are aligned with the machine direction extending longitudinally along the tube.

This structure possesses all the requirements for a caisson lining material. The four sheets are readily knitted to an appropriate size for caisson structures on a double-needle bed machine. The textile liner avoids the use of metals which would lead to corrosion of the caisson. Various knit parameters can be adjusted to tune the structure to particular size, strength and application requirements. In particular, knit structures can be selected that exhibit an expansivity that enables one size of sheet to be used across a range of caisson diameters. In preferred embodiments, glass fibre is used. Glass is an inert material, which poses little additional hazard in a flammable environment. It is also particularly strong, easily resinated and stabilised by the cured resin. All these characteristics are advantageous in any application to caisson repair.

Each join preferably includes a sewn seam. To strengthen these regions further, and so reduce the chances of their failing in operation, overlap parts may be formed from the fabric sheets and bonded to the underlying fabric, covering the seams. In order to form these overlaps, the pair of fabric sheets forming each half of the tube may be offset relative to each other in a circumferential direction, the offset preferably being in the range 50-200 mm.

A particularly preferred knit pattern for the textile is one created on four bars of a double needle bed knitting machine in which two outer bars are arranged to produce a tricot knit on respective beds and two inner bars are arranged to produce a tricot-type knit in which successive stitches are formed on alternate needle beds.

This knit pattern is sufficiently porous to encourage resin infusion and, particularly advantageously, has an expansivity and conformability that is well suited to caisson applications. Such a preferred embodiment may be rolled up for transport and then rolled off for installation, which, even in the confined space of an oil rig environment, will not unduly restrict the length that can be installed. This is in contrast to the steel liners of the prior art that are limited to 3 m lengths.

The tricot knit on the outer bars may be selected from a group comprising: 1-needle tricot, 2-needle tricot and 3-needle tricot. The product has a particularly high expansivity when produced using a 1-needle stitch. The expansivity of the material makes it possible to fabricate a single size of tube that may be fitted to a range of caisson sizes. This is very attractive commercially, reducing the product range necessary to cover the range of diameters typically used for caisson applications. However, for more specific size requirements, the less-expansive 2-needle or even 3-needle tricot stitch may be preferred.

The tricot-type knit produced by the two inner bars comprises a tricot-type stitch on one needle bed and an open loop stitch on the other needle bed, wherein on each respective needle bed, successively-formed stitches are stepped two needle positions in a zigzag pattern. This arrangement effectively links the fabric produced by the double needle bed machine, with an expansivity that is comparable with that of a 2-needle tricot-knitted fabric.

There are two preferred variations to strengthen the liner material, should some applications require it. First, a six-bar knit may be used to create the fabric sheets. The additional two bars are preferably arranged to each knit a tricot knit on a respective bed. Alternatively, a liner tube may be created from six sheets of double needle bed warp knitted fabric. In this embodiment, three fabric sheets are used to form each half of the tube. Both of these techniques result in the inclusion of more reinforcement material in the liner itself, which increases strength. The cost however is that such thicker materials will be more difficult to infuse with resin. Which characteristic is preferred will depend on many parameters relating to potential applications.

In a second aspect, the present invention provides a method of preparing a liner material for installation in a large-diameter pipe, the method comprising the steps of:

(a) Warp-knitting a pair of fabric sheets on a double needle-bed knitting machine;

(b) Tensioning the fabric sheets in their machine direction;

(c) Aligning the tensioned sheets and a stabilising mesh layer such that the mesh layer is intermediate the two sheets;

(d) Adhering the tensioned sheets and mesh together to produce a first mesh-stabilised web;

(e) Repeating steps (a) to (d) to produce a second mesh-stabilised web;

(f) Aligning the first and second mesh-stabilised webs to form a four-layer assembly;

(g) Connecting the webs along longitudinal joins that extend parallel to the fabric machine direction, one join towards each edge of the assembly;

(h) Tensioning the assembly;

(i) Heating the assembly, thereby removing the integrity of the stabilising mesh;

(j) Cooling the assembly; and (k) Removing the tension.

This method of producing a textile liner avoids the need to insert one textile tube inside another. In the prior art this insertion can only be carried out on tubes of limited size. Larger diameter tubes contain a considerable weight of material, rendering them difficult, if not impossible, to manipulate with the precision required. Large-diameter tube insertions are certainly beyond the limits of the equipment that is currently in use. Bonding fabric layers together using a flat-bed laminator is not so restrictive and so suitably large structures can be processed to a form suitable for use in lining caissons.

The problem with manipulating fabric sheets of the size required for caisson repair is that the warp-knitted structure readily reconfigures as its weight is redistributed and the sheets will therefore change their dimensions. Such instability makes it hard, in particular, to align a pair of sheets and, more generally, to process them with any degree of reproducibility. Such instability is reduced in this present invention by the novel approach of incorporating a more stable mesh structure between pairs of fabric sheets. This mesh structure is however only advantageous during processing: if retained in the liner it would hinder expansion and, indeed, make it impossible for the liner to expand uniformly. It is accordingly removed, or rather melted, in the later stages of forming the fabric to a tubular shape.

Preferably, the mesh stabilised webs are connected by sewing. More preferably, the sheets are aligned with an offset in the cross direction to leave an overlap region on each sheet. These overlaps are then bonded over the longitudinal join, which advantageously creates a stronger join between the two halves of the tubular shape.

Ideally, glass fibre yarn is used to knit the fabric sheets. Four guide bars of the double needle bed warp knitting machine may be used: two outer bars producing a tricot knit on each respective bed and two inner bars producing a tricot-type knit in which successive stitches are knitted on alternate beds of the knitting machine.

In order to produce a stronger fabric, six guide bars of the knitting machine may be used or three fabric sheets may be aligned to produce each half-pipe.

Preferably, the tubular structure produced by the method of this invention is then infused in a curable resin. This prepares the fabric for use in lining caissons. The tubular structure may be rolled up and transported to an oil rig, with resin infusion being carried out on site. Once infused, the structure may be inserted into the damaged caisson and the resin cured to effect the repair.

DESCRIPTION OF THE FIGURES

The invention will now be described, by way of example only, and with reference to the accompanying drawings, in which.

DETAILED DESCRIPTION

Figure 1:
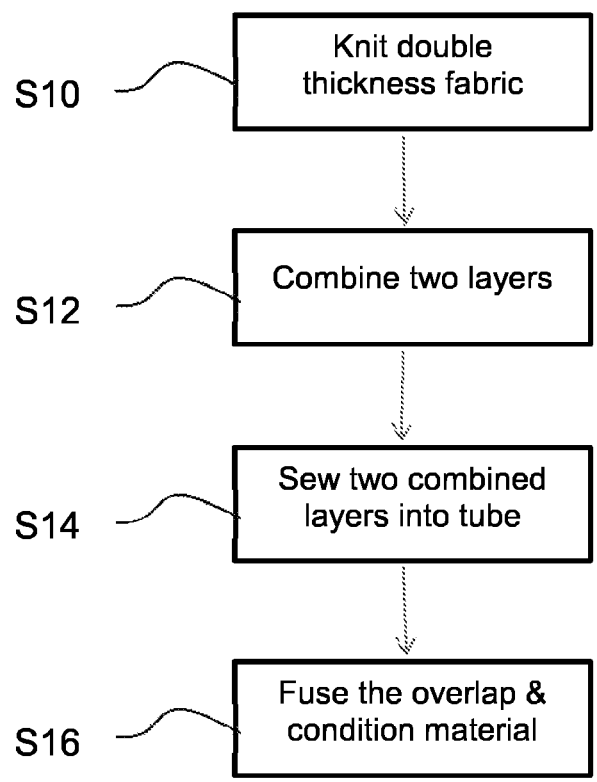
FIG. 1 is a flow chart setting out the process steps in constructing a tubular textile liner material of this invention.

With reference to FIG. 1, the process of constructing a liner material of a size and with performance characteristics suitable for lining a large-diameter pipe will now be described in overview. A more detailed description of each step in an exemplary process will be set out later, with reference to FIGS. 2 to 6.

As noted previously, improving the strength of each layer and so reducing the number of textile layers that may be needed to reinforce the hardened resin is a prime consideration of composite lining materials for large-diameter applications.

A first step S10 in a process in accordance with this invention is to use a double-bed knitting machine to knit a double-thickness, warp-knitted textile sheet using glass fibre yarn.

The knitted fabric will form the base layer of the composite liner, which gives it its flexibility in manoeuvring the liner into position and then, following curing, adds its strength as a reinforcement to the hardened resin. Resin infusion is a required step in processing the liner textile to form the composite structure that will line the pipe. It is well known that the yarns in a knitted material comprise a plurality of interlinked loops or stitches. Each loop is relatively loosely held in an open structure, which immediately provides material flexibility and accommodates expansion, while at the same time providing a structure that is amenable to resin infusion. The characteristics of such a warp-knitted fabric can be varied considerably, depending on many factors involved in the knitting process.

The yarn itself is crucial. In preferred embodiments of this invention a glass fibre yarn is used. Glass is a far stronger material than the polyester alternatives, although, when knitted, the bend at the top of each glass stitch is a significant weakness, limiting its application. However, when embedding the fabric in resin, the resin supports the glass stitch at each bend, which mitigates the weakness to an extent that glass is a viable material for use in this application. Resin-glass fibre composites produce a stiffer and stronger product in both tension and compression than polyester. The strength of the glass fibres means that they will preferentially take any load placed on the composite. This improved strength allows the same performance to be realised with fewer textile layers.

The strength of the knitted textile may also be increased simply by knitting more yarn into the fabric. This may be achieved by increasing the number of guide bars involved in the knit. Each bar of the knitting machine is used to knit a yarn into a pre-set pattern within the developing fabric. The more guide bars involved, the denser the knit. The gauge of the knit, i.e. the number of stitches per inch, can also be increased to increase the density of the fabric. There is a limit to the yarn density however for pipe-lining applications in that too dense a material inhibits infusion of resin. On the other hand, glass tends to link with resin more effectively than alternative knitted materials, which allows a denser structure to perform effectively within a composite.

In the process of this invention a double-bed knitting machine is used to knit the fabric. Selected guide bars within each bed are configured to loop the yarn successively around hooks on first one and then the other bed, resulting in an interlinked fabric of double thickness. That is, the knitting process itself effectively produces a two-layer material.

A next step S12 in the process is to stack two of these double-thickness fabric layers, one on top of each other, the layers being fixed in position with a suitable adhesive. In forming this stack, the fabric layers are not exactly in register, but positioned with a short lateral displacement such that a single-layer overlap is present at each end.

At Step S14, two of the combined layers obtained at Step S12, are again stacked, with touching surfaces aligned such that the single-layer overlap remains present at each end. This structure is sewn together along two seams, each adjacent and running parallel to one of the overlaps. Each seam therefore stitches three layers together, missing out the layer that is displaced laterally to form the overlap at the opposing seam.

Finally, at Step S16, each overlap portion is folded down over its respective adjacent seam onto the opposite side of the tubular structure to meet the edge of the layer whose displacement provides the opposing overlap. The folded portions are then bonded to the structure. At the end of these process steps, the result is a tubular structure, each half-pipe side of the tube being formed by a stacked pair of double-thickness fabric layers.

The resulting tubular knitted multi-layer fabric is now ready to be transported to site. It is envisaged that, primarily, resin infusion will take place on site, although pre-resinated tubes may also be transported under some circumstances. The liner is installed in the pipe to be repaired by the inversion method using a calibration tube. In the case of caisson repair, the caissons are generally vertical and so the resinated liner may simply be dropped down into the caisson. The calibration tube is then lowered down the middle of the liner, the pressure from the tube forcing the fabric against the side walls of the pipe. The resin is left to cure, with the result that the liner is fixed to the pipe. After curing, the calibration tube is removed.

Using this process, the step S12 at which layers of knitted fabric are combined is, unlike the prior art described in WO2015/166268, not carried out on tubular material, but on flat sheets. A flatbed laminator, sufficiently large examples of which are available commercially, is used. This novel procedure accordingly avoids the limitation of the tubular insertion requirement of the prior art. The process of the present invention is therefore more readily scaled up to sizes appropriate for large-diameter pipes.

Liners with an installed fabric layer of thickness 3-7 mm have been made using the process of this invention. For larger caissons, or for those in which this thickness provides insufficient reinforcement, the installation process can simply be repeated with a second length of resinated liner. The caisson thus receives a double lining. Fabric thicknesses of around 10 mm are anticipated to be sufficient for the majority of caisson structures. An advantage of this process however is that it is not limited to two applications. Still larger caissons, with greater operating strength requirements, may be repaired with multiple layers, each fabricated using the process of this invention and applied to the caisson in successive infusion and installation operations.

A further advantage of this present invention relative to the steel liners of the prior art, is that the textile liner is far more straightforward to transport and to manipulate into position during a repair. The material is lighter, can be rolled onto a mandrel for transport and off the mandrel as it is resinated and inserted into the caisson. Moreover, it is not limited to 3 m lengths, making it far more straightforward to effect larger repairs.

Figure 2:
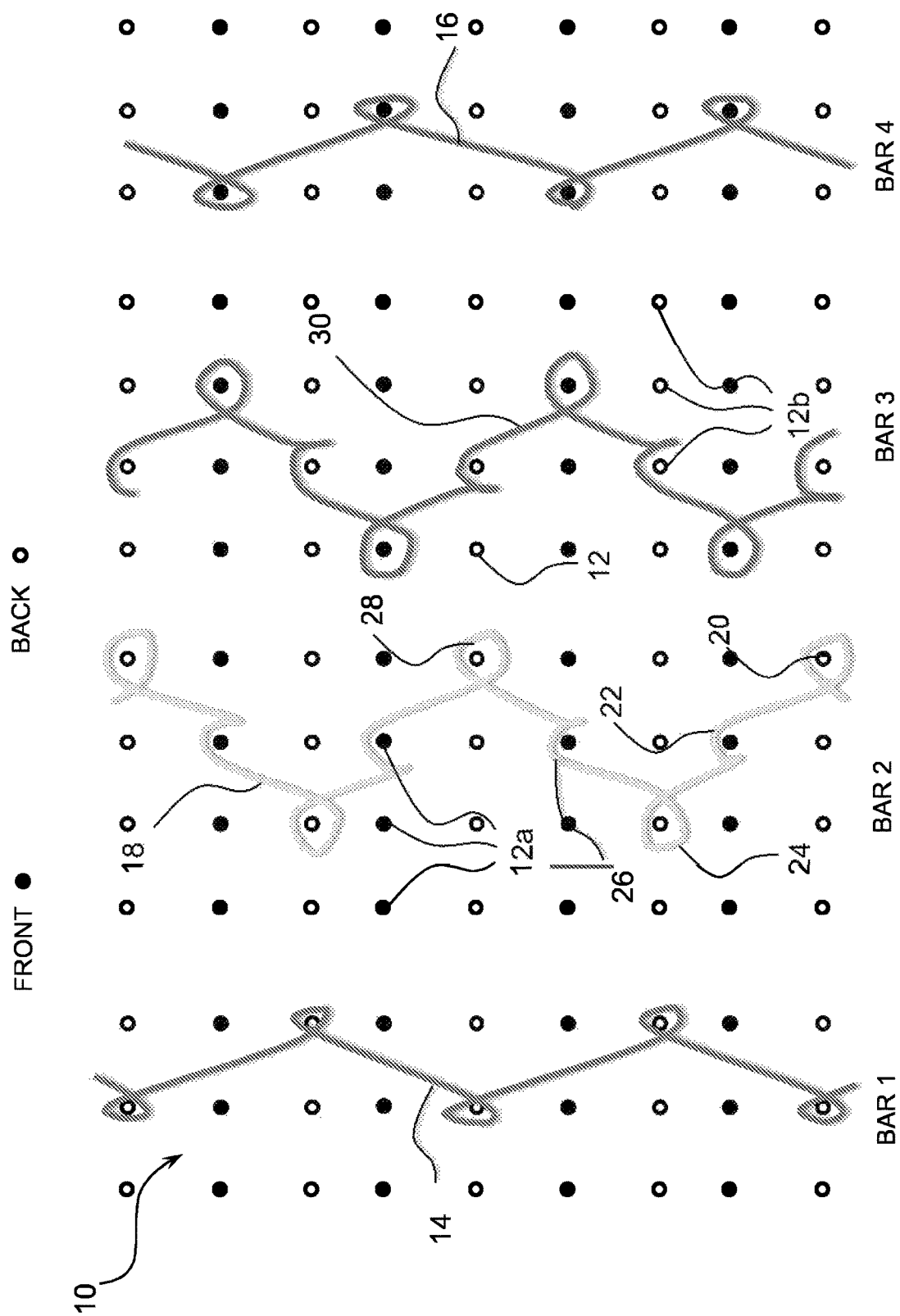
FIG. 2 is a binding diagram illustrating a knitting structure used on each bar for a preferred embodiment of the textile material in accordance with this invention.
Figure 3:
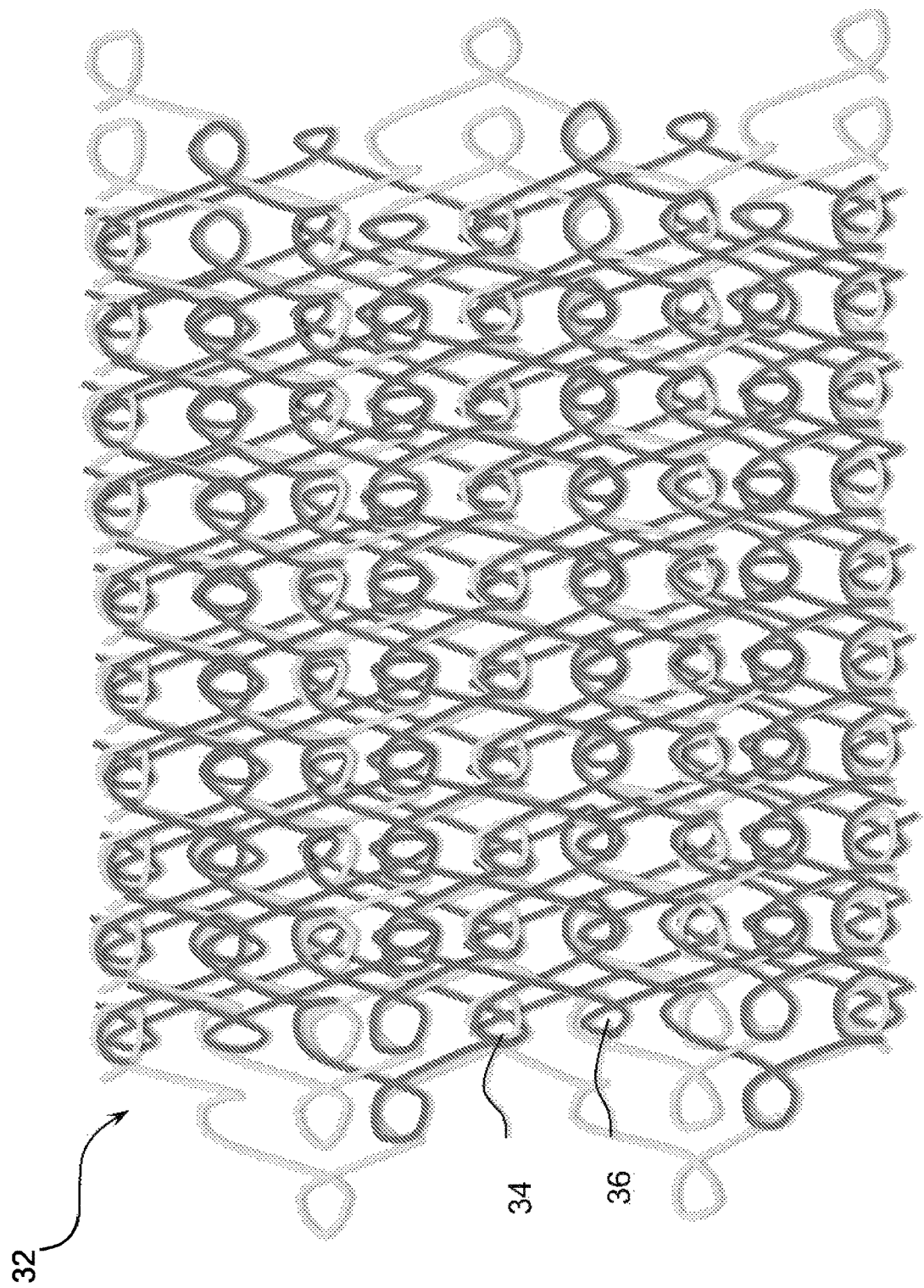
FIG. 3 is a binding diagram illustrating the composite 4-bar knit shown in FIG. 2.

The particular knit used in a preferred embodiment of the fabric of this invention is illustrated in FIGS. 2 and 3. Both figures are binding diagrams, FIG. 2 illustrating the stitching pattern 10 on each of four guide bars of the double-bed knitting machine, while FIG. 3 illustrates the combined knit from all bars.

A binding diagram, as is well known in the field, is a symbolic representation of the movements of the guide bars of a knitting machine as it draws the yarn about needle positions to create the fabric. From this, a skilled operator can produce the same fabric pattern with a suitably configured machine. Each dot 12 represents one needle head at one point in time. This pattern 10 depicts a knit carried out on a double-bed machine in which one needle bed is located in a forward position and the second behind the first bed, in a rearward position. Accordingly, a first series of filled dots 12a represents needle head positions on the front needle bed and a second series 12b of open circles represents needle head positions on the back needle bed. Each horizontal row of dots represents a series of needles during one stitch forming process. That is, one row or course of the fabric. The rows of dots from bottom to top represent a succession of stitch-forming processes, which alternate between beds of the machine. The vertical direction on the page thus corresponds with the machine direction and the horizontal axis with the cross direction. The path followed by the guide bars is drawn in front of and behind the needles.

A path 14 followed by bar 1 of the machine is shown to the left hand side of the figure. This bar 1 effects a tricot knit (1-needle tricot knit) on the back needle-bed only. That is, the yarn is drawn such that it knits a stitch one needle position to the left and then back to knit one position to the right in subsequent rows on the back needle-bed side of the machine. Shown at the far right of the figure, bar 4 follows a path 16 that produces a similar 1-needle tricot knit but on the front needle bed only.

A path 18 followed by bar 2 is shown second left in the Figure. This bar knits a tricot-type stitch 20 on the back needle bed but then moves to a needle one position to the left of the equivalent position on the front needle bed and forms an open loop stitch 22. The guide bar moves again one position to the left, switches to the other side of the machine and knits a tricot-type stitch 24 on the back needle bed. The step direction is then reversed. The yarn is drawn back two needle positions to the right, first forming an open loop stitch 26 on the front needle-bed and then a tricot-type stitch 28 on the back needle bed. This pattern is repeated by this bar 2 during the course of the knit.

A path 30 followed by bar 3 is shown second right in FIG. 2. This path produces a knit pattern that is similar to that of bar 2, but on opposite needle beds. That is, bar 3 executes a 2-needle tricot knit on the front needle bed and an open loop stitch on the back needle bed intermediate each tricot stitch.

FIG. 3 is the binding diagram 32 showing the paths followed by all four bars of this double-bed knitting machine. Stitch rows 34, 36 alternate between the front and back needle beds, creating a double-thickness fabric sheet. The tricot knits used ensure that the fabric retains sufficient flexibility for manipulation into caissons; sufficient expansivity for it to be pressed against the caisson wall on installation and a sufficiently open structure to permit ready infusion with resin.

As is well known in the art, knit parameters can be varied to tune the characteristics of a knitted fabric. In addition to stitch length and gauge, noted previously, the number of needles stepped by the tricot stitch affects the orientation of the yarn in the knitted stitch and thus the expansivity of the fabric. In this preferred embodiment a mixture of 1- and 2-needle tricot stitches are used, which provides for around a 40% expansion. Such expansivity simplifies production. Pipe diameters anywhere within, for example, a range of 1 m and 1.4 m, may be repaired using a standard diameter fabric tubing. If the outer bars 1, 4 knit a 2-needle stitch, the resulting fabric would be heavier and able to fit only a more limited range of diameters.

In the much preferred embodiment, the yarn material used is purely glass fibre. As noted, glass fibres are particularly strong when used as reinforcement in a resin composite and so will preferentially take up any load placed on the liner material. Glass is also non-toxic and non-flammable. This however is not to be seen as limiting. Glass may alternatively comprise one component of the knitted fabric, albeit a major one, knitted on selected bars. One bar could, for example, knit another material such as aramid, nylon, polyester, polypropylene, rayon, cotton, basalt, metals, PEEK (polyester ester ketones) or dyneema into the fabric.

FIG. 4 is a schematic illustration of the laminating stage in the process of producing a textile suitable for use as a lining material for large-diameter pipes. The fabric that comes off the knitting machine is double thickness, but still not strong enough to withstand the forces necessary for operation in the caisson environment. Accordingly it needs to be layered-up.

Figure 4A:
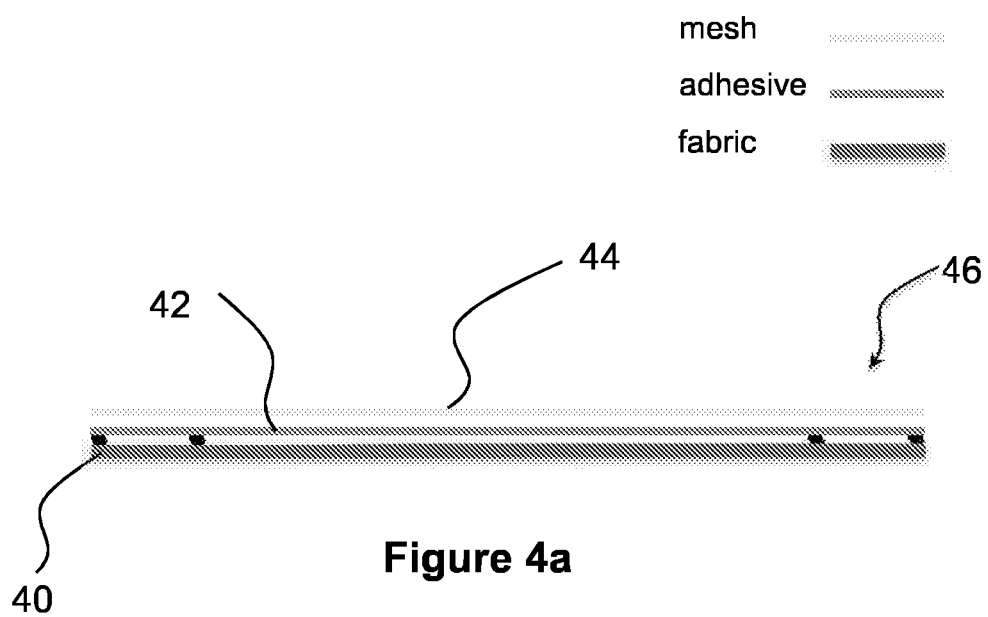
FIG. 4 is a schematic diagram illustrating the lamination process used to combine layers of knitted textile material in the process of forming a tube in accordance with this invention.

FIG. 4a shows a first stage in this process. A layer of fabric 40, as produced by the double-bed knitting machine, is placed under tension in the machine direction. The fabric 40 is relatively loosely structured, which makes it easy to manipulate but also difficult to control. Tricot-knitted fabric has the property that if it is expanded in one direction, the stitches reconfigure such that it contracts in a perpendicular direction. By placing the fabric 40 under longitudinal tension, the width of the fabric is reduced. This technique may be used to provide a controlled width, which is better able to be maintained through subsequent processing. Once the fabric 40 is tensioned, it is coated with an adhesive 42 and then a lightweight mesh 44. The layered structure is passed through a laminator (not shown), which melts the adhesive 42 thereby bonding the mesh 44 to the fabric 40. The lightweight mesh 44 helps to stabilise the fabric 40, holding it to its tension-controlled width. The result is a mesh-stabilised double-thickness fabric web 46.

The mesh 44 is, for example, a hexagonal structure polyethylene net with a density in the region of 10-20 $gm^{-2}$. The adhesive 42 may be in the form of a film layer, a powder bonding adhesive or, preferably, a non-woven adhesive mesh. The selection will depend on the nature of the fabric and mesh materials and proposed application, as will be apparent to one skilled in the art.

Figure 4B:
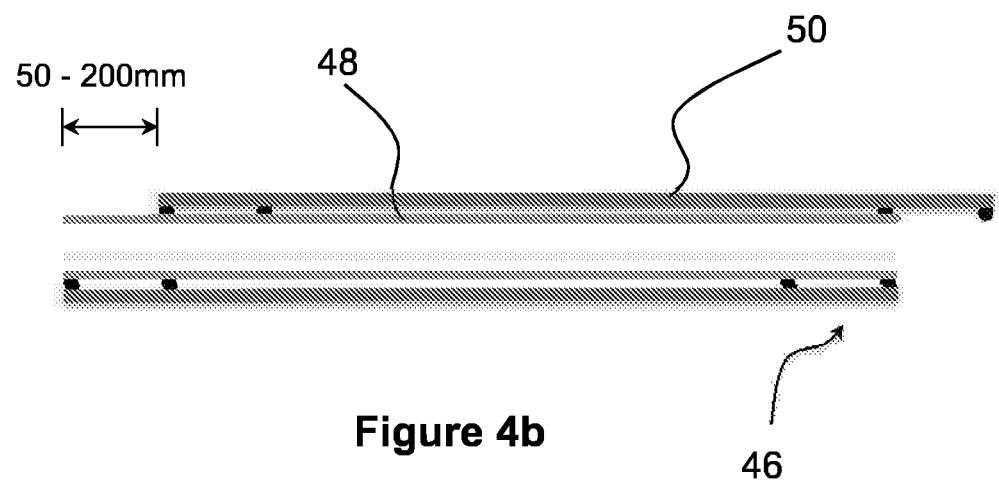
Figure 4C:
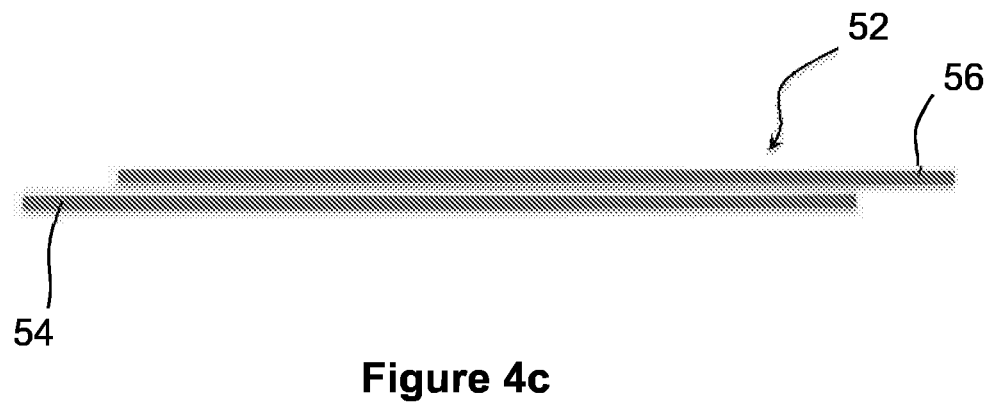

FIG. 4b illustrates a second stage in the laminating process. The mesh-stabilised double-layer fabric web 46 is coated on its mesh-side by a second adhesive layer 48, which is aligned with the web 46. A second fabric layer 50, also under tension such that its width is similar to that of the first layer 40, is placed on top of this second adhesive layer 48 but offset in the cross-direction (width) by a distance of 50 to 200 mm. This second structure 46, 48, 50 is then passed for a second time through the laminator, which this time melts the second adhesive layer 48. The two layers of fabric 40, 50 are thereby bonded to each other, but through the intermediate mesh 44, which importantly imparts structural stability to the joined fabric layers.

In an alternative process, the bonded fabric layers may be laminated once as a five-layer assembly: first fabric 40, first adhesive 42, mesh 44, second adhesive 48 and offset second fabric 50. A single pass through the laminator melts the adhesive and binds the two fabric layers through the mesh.

In either case, the result (FIG. 4c) is a mesh-stabilised double-layer fabric structure 52 with a mesh-coated single-layer overlap 54 extending to one side of the structure and a single-layer overlap 56 that is free of mesh and adhesive extending to the other.

It will be apparent to one skilled in the art that the stabilising layer is advantageously in the form of a mesh as the openings in this structure facilitate passage of the adhesive. This allows the adhesive to bind the two double-thickness fabric layers 40, 50 together and also to bind the mesh filaments to the fabric. Although a hexagonal structure is used in this embodiment, other mesh structures, for example a square mesh, may alternatively be employed. The relative size of the openings in comparison with the netting structure will affect the strength of the bond between fabric layers 40, 50 and also the degree of stabilisation the mesh is able to provide. These factors can be tuned as required. The mesh structure holds the fabric layers in a sufficiently stable arrangement that the longitudinal tension that was applied as the structures passed through the laminator can now be removed.

Figure 5A:
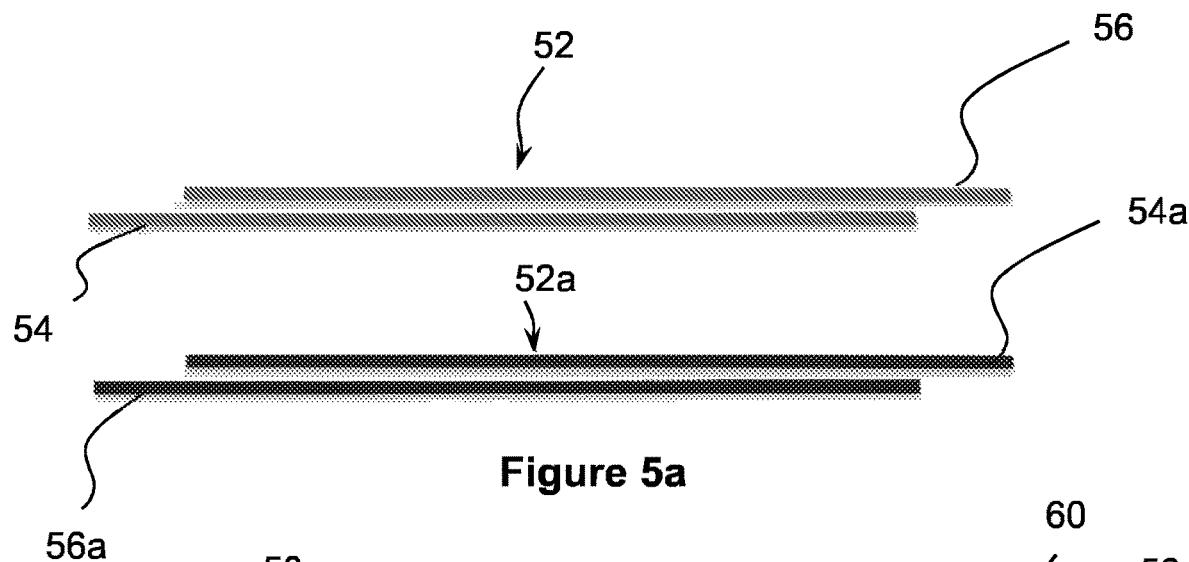
FIG. 5 is a schematic diagram illustrating the process of forming a tube from the textile layers of FIG. 4.
Figure 5B:
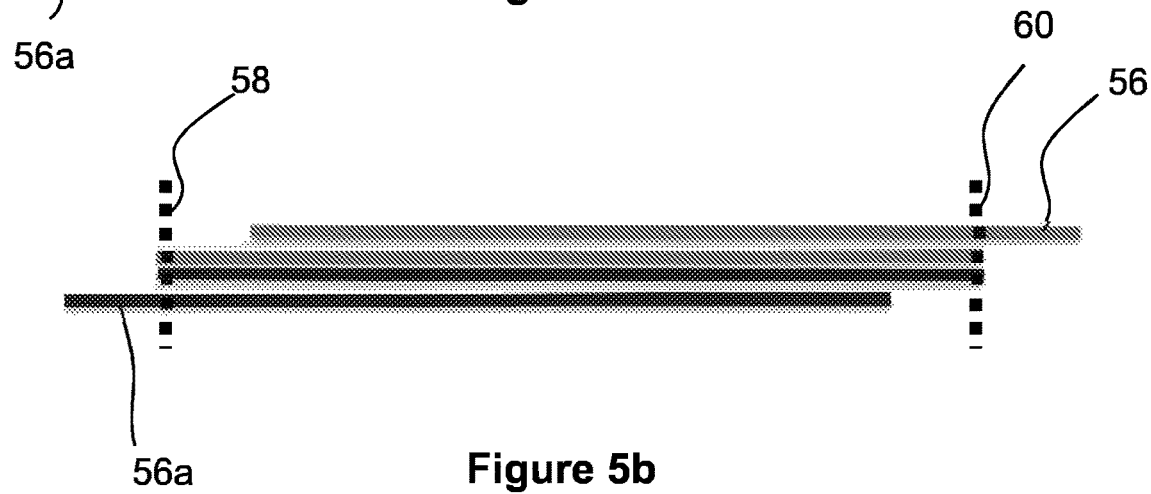

It is only at this stage that the mesh-stabilised double-layer fabric structure 52 is fabricated into a tubular shape. The process is illustrated in FIG. 5. First, as indicated in FIG. 5a, a first mesh-stabilised structure 52 is aligned with a second similarly-constructed structure 52a. Structures 52, 52a are placed one on top of the other, as shown in FIG. 5b, such that adjacent fabric layers are aligned. This leaves the majority of the structure as being built up of four fabric layers, although this falls to three layers towards either end and then to respective single-layer 56, 56a overlaps. This assembly is machine sewn at its edges to form seams 58, 60 adjacent to, but not on, the overlaps 56, 56a.

Figure 5C:
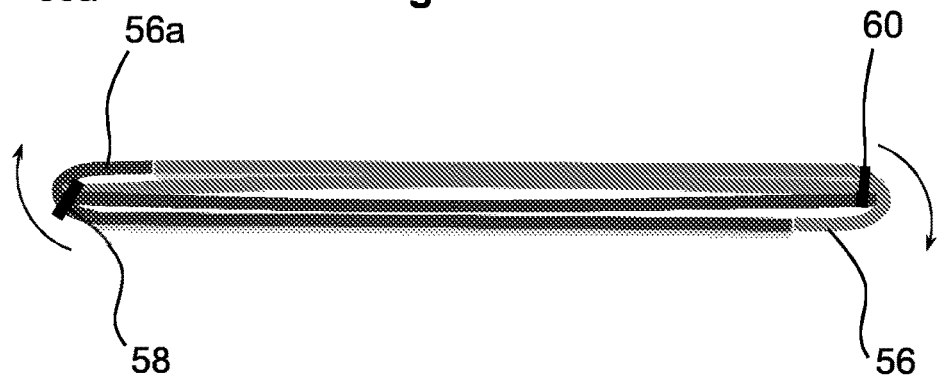
Figure 6:
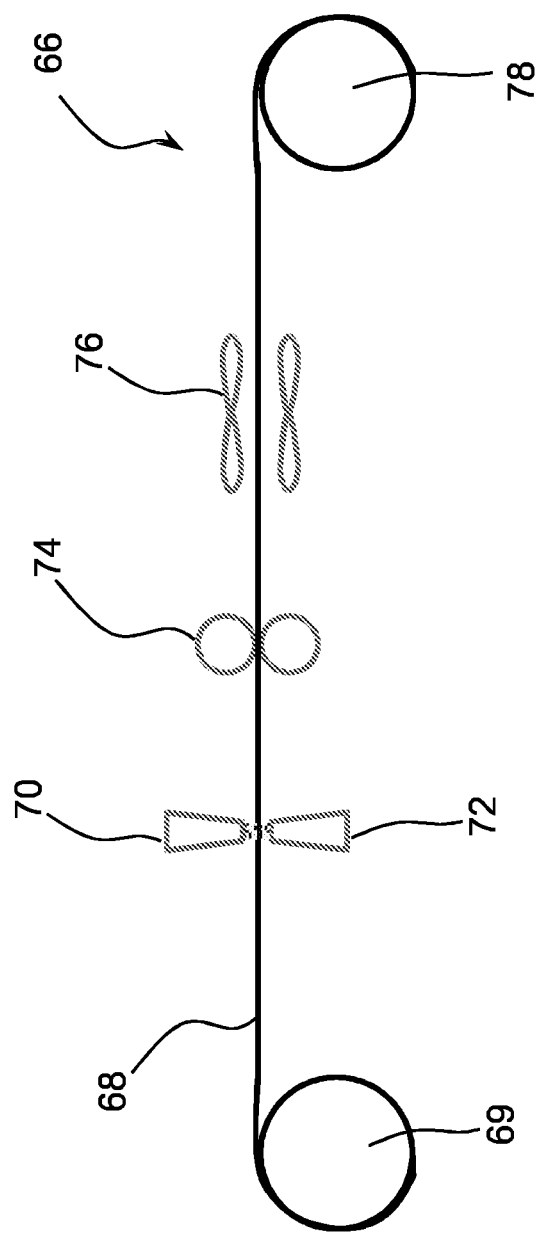
FIG. 6 is a schematic illustration of the apparatus used in the finishing stages of processing the textile layers into a tube.

Once sewn on both seams 58, 60, the structure may be loosely folded on a pallet, rolled onto a mandrel or placed on any conveniently-movable holding device ready for transportation to and processing by the apparatus shown in FIG. 6. The next stage in preparing the fabric for pipe-lining applications will be described more fully in relation to FIG. 6 but the result is illustrated briefly in FIG. 5c. The loose fabric of each overlap 56, 56a is folded about its adjacent seam 58, 60 such that the overlap 56, 56a meets with the respective outer fabric layer from the other structure 52a, 52, which is offset as a result of the opposite overlap 56a, 56. After bonding the overlaps, the fabric forms a folded tubular structure, the tube walls being two fabric layers thick.

FIG. 6 illustrates schematically, the progress of the sewn tubular structure through apparatus 66 that performs the final stages of processing to render it suitable for use in lining caissons. The flattened tubular structure 68 is let off its holding device 69 and pulled towards a mandrel 78 in a controlled manner. This enables the structure 68 to be held under a set longitudinal tension as it progresses along a path through the apparatus 66. The apparatus 66 includes hot air nozzles 70, 72 that are placed both above and below the path of the tubular structure 68, a nip roller 74, and cooling apparatus 76. After cooling, the structure is wound onto a mandrel 78.

As the tubular structure 68 enters the apparatus 66, the overlaps 56, 56a are folded over the seams in the manner shown in FIG. 5c. Hot air is then blown through the structure by the nozzles 70, 72. The heat melts the stabilising mesh and reactivates the adhesive. The mesh is no longer required, it having served its purpose in ensuring that the width of the inherently expandable fabric remained under control as it was sewn. In fact, the presence of the mesh would severely impair the ability of a liner fabricated from this material to expand against a pipe during CIPP rehabilitation. This is clearly undesirable. Stability through this final processing stage is maintained by the controlled tension.

Once the adhesive is reactivated, the structure 68 is passed through the nip roller 74, which presses on the loose fabric of the overlaps 56, 56a such that they form lap joins in bonding to the underlying layer.

Longitudinal tension is maintained as the structure 68 is pulled past cooling fans 76. Once cooled, the tension is released and the fabric rolled up 78 in preparation for storage, transport and subsequent use.

Figure 7:
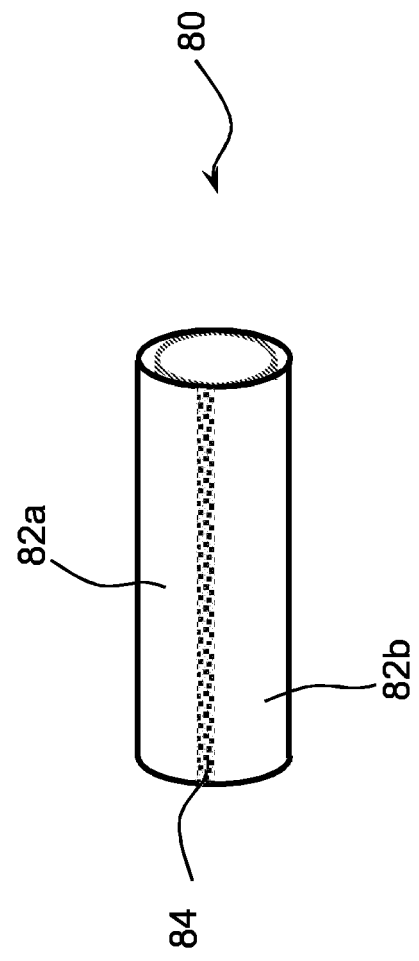
FIG. 7 is an illustration of the resulting tubular structure.

The resulting structure 80 (before rolling) is shown, in an unflattened form, in FIG. 7. This comprises four (double-thickness) fabric sheets, pairs of which are formed into a double-layer half-pipe 82a, 82b, the two halves of the pipe being connected by a pair of longitudinal joins 84 to form a tubular structure. This structure, which has a circumference equal to twice the width of the original fabric sheets and a thickness of two (double needle bed) knitted sheets may now be used as a textile liner for the repair of large-diameter pipes.

Known installation processes for CIPP rehabilitation may be used for caisson applications. The tubular textile liner is infused with resin and then fed into the caisson, being positioned such that it spans the damaged part. Using a calibration tube, pressure is applied such that the liner is expanded evenly against the caisson walls. The resin is then cured. The result is a textile-reinforced composite with sufficient strength to line and so repair the caisson.

Specific examples of a fabric according to this invention have been made. For example, sheets knitted on 640 needles have been used to construct a tube with a lay-flat width of 1.25 m that can be used to repair caissons in the 1000-1400 mm diameter range. It is envisaged that still larger tubular structures could also be fabricated: 832 needles to knit sheets that are assembled into a tube with 1.625 m lay-flat width. This sizing would be suitable for repairing caissons in the 1300-1820 mm range.

In larger caisson structures, or those whose field of operation has higher strength requirements, a single layer of the embodiment of lining material described above may not be sufficient. As noted previously, a stronger repair may be effected by simply repeating the installation process with a second length of tubular fabric. This approach, although it may be necessary on occasion, is not ideal. For practical reasons, it is desirable to minimise the time spent actually on an oil rig carrying out the repair. The longer it takes to repair a caisson, the longer it is out of action. Curing is a relatively lengthy part of the installation process and so the requirement for two (or more) curing processes is best avoided.

An alternative to increasing the number of fabric layers by multiple installations is to increase the layering prior to installation. The preferred embodiment so far described first combines two layers of double-thickness knitted fabric to produce the mesh-stabilised web and then joins two of these mesh-stabilised webs to form the tubular structure. This selection represents a balance between strengthening the liner by including as much reinforcing material as possible and leaving the textile sufficiently porous to allow effective resin infusion. If not encased properly in resin, then the cured composite will not perform satisfactorily.

It is envisaged that textiles with an additional fabric layer could readily be constructed using the method of this invention and, if they could be resinated effectively may also be suitable materials for caisson repair. An additional layer could, for example be added during lamination. That is, by adding more adhesive and an offset third fabric layer to the structure shown in FIG. 4c. An additional mesh layer may also be required to maintain the stability of the heavier structure. If this mesh-stabilised fabric web is then processed to form a tubular structure following the teaching of this invention, then the resultant tube would have walls with a thickness of three double needle bed fabric layers.

The difficulties in handling the material of this invention should not however be overlooked. The 2-layer tubes knitted from glass fibre weigh around 10 $kgm^{-1}$ and, for caisson lining, they are fabricated to lengths of around 100 m. Increasing this weight by 50%, as in a 3-layer tube, would increase the load on machinery and personnel involved in manipulating the fabric through its various processing stages. Sewing this additional layer would also be more difficult to achieve.

Figure 8:
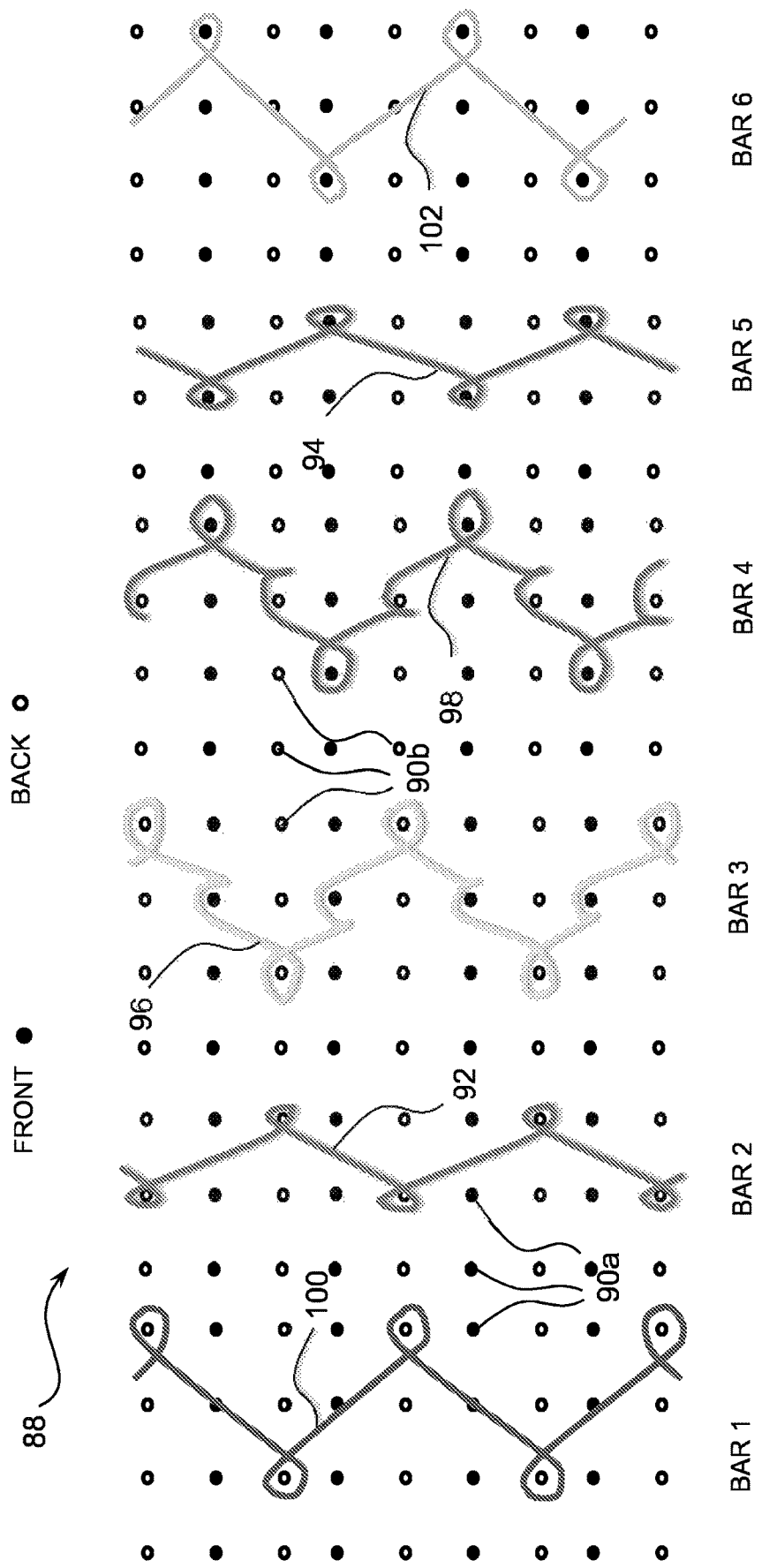
FIG. 8 is a binding diagram illustrating a 6-bar knit that may alternatively be used to produce a textile material in accordance with this invention.

An alternative approach to increasing strength is to add more glass yarn to the fabric when it is knitted. One example of how this may be achieved is to used six bars to knit the fabric instead of the previously-described four. With a six-bar fabric, more glass is present, which makes for an advantageously stronger material. An alternative knitting structure 88 for a textile material in accordance with this invention and that is made following this approach is shown in FIG. 8. FIG. 8 is similar to FIG. 2 in that it illustrates the stitching pattern on each guide bar of a knitting machine. A double-bed knitting machine again carries out the knit and so filled dots 90a represent needle head positions on the front needle bed and open circles 90b represent positions on the back needle bed. As will be apparent, this pattern differs from that shown in FIGS. 2 and 3 in that six guide bars are used to knit the fabric. It is believed that as glass links more effectively with resin than alternative yarn materials, the denser knitted structure of a textile produced on six guide bars will still be a viable product for resin infusion and therefore for use in repairing caisson structures.

In this six-bar knit 88, the patterns knitted on bars 1 through 6 are shown from left to right in FIG. 8. Bars 2-5 knit the same pattern as the four bars used in the four-bar fabric. That is, bar 2 effects a 1-needle tricot knit 92 on the back needle-bed and bar 5 produces a similar 1-needle tricot knit 94 on the front needle bed. Bars 3 and 4 pull the yarn between needle beds. Bar 3 knits a 2-needle tricot knit 96 on the back needle bed and, intermediate each tricot stitch, an open loop stitch on the front needle bed. Bar 4 knits the reverse: a 2-needle tricot knit 98 on the front needle bed and an open loop stitch on the back needle bed intermediate each tricot stitch. Bars 1 and 6 carry out a 2-needle tricot knit on, respectively, the back 100 and front 102 needle beds.

It is not strictly necessary for each guide bar 1-6 to knit their part of the fabric in the order shown. The outer bars, 1 and 6 are responsible for knitting the outside of the fabric and, as such, should produce an even knit with a yarn whose path does not switch between needle beds. In this exemplary knit therefore, the stitching patterns of bars 1 and 2, and those of bars 5 and 6, could be swapped with little adverse effect on the performance of the fabric.

The above description is that of the current embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. A material for use in lining large-diameter pipes, the material comprising four sheets of a double-bed warp-knitted fabric having a machine direction and a cross direction, the sheets being arranged into a tubular structure with
   a first half of the tube comprising a first pair of fabric sheets, one forming an inside surface of the half-tube; and the other forming an outside surface; and
   a second half of the tube comprising a second pair of fabric sheets similarly aligned wherein
   the first and second halves of the tube are connected at a pair of longitudinally extending joins; and
   the four fabric sheets are aligned with the machine direction extending longitudinally along the tube.

2. A material according to claim 1 wherein each longitudinally extending join includes a sewn seam.

3. A material according claim 1 wherein the material comprises six sheets of a double-bed warp-knitted fabric and each half of the tube includes a third fabric sheet intermediate its pair of fabric sheets.

4. A material according to claim 1 wherein the pair of fabric sheets forming each half of the tube are offset relative to each other in a circumferential direction thereby forming an overlap part.

5. A material according to claim 4 wherein the offset is in the range 50-200 mm.

6. A material according to claim 5 wherein each overlap part is bonded to a layer of the other half of the tube.

7. A material according to claim 6 wherein the overlap parts extend over the sewn seam.

8. A material according to claim 1 wherein the material is knitted from a glass fibre yarn.

9. A material according to claim 8 wherein the material is knitted on a double-bed knitting machine in which two outer bars are arranged to produce a tricot knit on each respective bed and two inner bars are arranged to produce a tricot-type knit in which successive stitches are knitted on alternate beds of the knitting machine.

10. A material according to claim 9 wherein the tricot knit produced by said two outer bars is selected from a group comprising: 1-needle tricot, 2-needle tricot and 3-needle tricot.

11. A material according to claim 10 wherein a further two bars of the knitting machine are arranged to produce a second tricot knit on each respective bed.

12. A material according to claim 11 wherein the second tricot knit produced by said further two bars is selected from a group comprising: 1-needle tricot, 2-needle tricot and 3-needle tricot.

13. A material according to claim 12 wherein the tricot-type knit produced by the two inner bars comprises a tricot-type stitch on one needle bed and an open loop stitch on the other needle bed, wherein on each respective needle bed, successively-formed stitches are stepped two needle positions in a zigzag pattern.

14. A method of preparing a liner material for installation in a large-diameter pipe, the method comprising the steps of:
   (a) Warp-knitting a pair of fabric sheets on a double needle-bed knitting machine;
   (b) Tensioning the fabric sheets in their machine direction;
   (c) Aligning the tensioned sheets and a stabilising mesh layer such that the mesh layer is intermediate the sheets;
   (d) Adhering the tensioned sheets and mesh together to produce a first mesh-stabilised web;
   (e) Repeating steps (a) to (d) to produce a second mesh-stabilised web;
   (f) Aligning the first and second mesh-stabilised webs to form a four-layer assembly;
   (g) Connecting the webs along longitudinal joins that extend parallel to the fabric machine direction, one join towards each edge of the assembly;
   (h) Tensioning the assembly;
   (i) Heating the assembly, thereby removing the integrity of the stabilising mesh;
   (j) Cooling the assembly; and
   (k) Removing the tension.

15. A method according to claim 14 wherein Step (a) is carried out using glass fibre.

16. A method according to claim 15 wherein the mesh-stabilised webs are connected together at Step (g) by sewing.

17. A method according to claim 16 wherein:
   in aligning the tensioned sheets and mesh in Step (c), the sheets are offset in a cross-direction with respect to each other to leave an overlap region on each sheet;
   in aligning the first and second mesh-stabilised webs to form a four-layer assembly at Step (f), one of the overlap regions from each web extends from each side; and
   after connecting the webs along longitudinal joins, the method includes the additional step of folding the overlap regions over the joins prior to heating the assembly at Step (i), whereby at this Step (i), the overlap regions are bonded over the joins.

18. A method according to claim 17 wherein in carrying out Step (a) two outer bars of the knitting machine produce a tricot knit on each respective bed and two inner bars produce a tricot-type knit in which successive stitches are knitted on alternate beds of the knitting machine.

19. A method according to claim 18 wherein a further two bars of the knitting machine produce a second tricot knit on each respective bed.

20. A method according to claim 19 wherein the tricot knit on the outer bars is selected from a group comprising: 1-needle tricot, 2-needle tricot and 3-needle tricot.

21. A method according to claim 19 wherein the second tricot knit is selected from a group comprising: 1-needle tricot, 2-needle tricot and 3-needle tricot.

22. A method according to claim 18 wherein Step (a) includes warp-knitting a third fabric sheet and Steps (b) to (d) are carried out with the three fabric sheets and, if dependent on claim 15, the step of aligning three fabric sheets includes aligning them with respective offsets.

23. A method according to claim 22 wherein the method includes the additional step of infusing the assembly in a curable resin.

24. A method according to claim 23 which includes the additional steps of inserting the infused assembly into a caisson and curing.

* * * * *